United States Patent
Suzuki

(10) Patent No.: US 10,255,532 B2
(45) Date of Patent: Apr. 9, 2019

(54) IMAGE FORMING APPARATUS, AND METHOD OF CONTROLLING THE SAME

(71) Applicant: CANON KABUSHIKI KAISHA, Tokyo (JP)

(72) Inventor: Tatsunori Suzuki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/955,027

(22) Filed: Apr. 17, 2018

(65) Prior Publication Data

US 2018/0307953 A1 Oct. 25, 2018

(30) Foreign Application Priority Data

Apr. 24, 2017 (JP) ................... 2017-085611

(51) Int. Cl.
| | |
|---|---|
| G06K 15/02 | (2006.01) |
| G06F 3/12 | (2006.01) |
| H04N 1/60 | (2006.01) |
| H04N 1/411 | (2006.01) |

(52) U.S. Cl.
CPC ......... *G06K 15/1865* (2013.01); *G06F 3/122* (2013.01); *G06F 3/1208* (2013.01); *G06F 3/1247* (2013.01); *G06F 3/1274* (2013.01); *H04N 1/411* (2013.01); *H04N 1/6063* (2013.01)

(58) Field of Classification Search
CPC ........................................................ G06F 3/12
See application file for complete search history.

(56) References Cited

U.S. PATENT DOCUMENTS

| | | | | |
|---|---|---|---|---|
| 6,600,569 | B1 * | 7/2003 | Osada | G06F 3/1296 358/1.1 |
| 2008/0159650 | A1 * | 7/2008 | Odamaki | G06K 9/38 382/283 |
| 2011/0058191 | A1 * | 3/2011 | Tokumoto | G06K 15/02 358/1.9 |

FOREIGN PATENT DOCUMENTS

JP 2012-086450 A 5/2012

* cited by examiner

*Primary Examiner* — Ibrahim Siddo
(74) *Attorney, Agent, or Firm* — Carter, DeLuca & Farrell, LLP

(57) ABSTRACT

An image forming apparatus stores raster image data corresponding to a background in a compressed format and generates intermediate data corresponding to a foreground of the background based on obtained print data. A decompressor decompresses the raster image data stored in the memory device and a rasterizer generates new raster image data based on the raster data corresponding to the background obtained by the decompression and the generated intermediate data corresponding to the foreground. When a request is made to stop the generation of the new raster image data in a state of waiting for at least a portion of the raster image data corresponding to the background to be decompressed, the rasterizer stops generation of the new raster image data, and the decompressor continues decompressing the at least a portion of the raster image data corresponding to the background.

18 Claims, 14 Drawing Sheets

IMAGE FORMING APPARATUS, AND METHOD OF CONTROLLING THE SAME

BACKGROUND OF THE INVENTION

Field of the Invention

The present invention relates to an image forming apparatus and a method of controlling the same.

Description of the Related Art

There are printing apparatuses that receive, from a host computer or the like, electronic data, such as an electronic document and PDL (page description language) data including a plurality of objects, and perform printing based on the electronic data. In such printing apparatuses, it is necessary, when a job cancel request is inputted from a user during printing, for a module that is internal to the printing apparatus to forcibly stop processing that is currently being performed. In printing apparatuses, there is an image processing module for which forcible stoppage is impossible and which executes a full set of processing without being forcibly caused to stop even if a job cancel request is inputted by a user in such a case. In Japanese Patent Laid-Open No. 2012-86450, a safe method of stopping a job in a configuration in which a rendering processing module for which forcible stoppage is possible and an image processing module for which forcible stoppage is not possible are connected is proposed. According to this, by transmitting pixel data of a color value that is defined in advance to the image processing module for which forcible stoppage is not possible, the image processing module for which forcible stoppage is not possible is caused to stop safely.

However, in configurations described above in which the rendering processing module for which forcible stoppage is possible and the image processing module for which forcible stoppage is not possible are directly connected, there are configurations in which the rendering processing module receives pixel data transmitted from the image processing module for which forcible stoppage is not possible. In such a case, there was a problem in that, when the rendering processing module stops without having received pixel data transmitted from the image processing module for which forcible stoppage is not possible, untransmitted pixel data remains, and an incorrect rendering occurs in rendering processing after the stoppage completion.

SUMMARY OF THE INVENTION

An aspect of the present invention is to eliminate the above-mentioned problem with conventional technology.

A feature of the present invention is to provide a technique in which even when decompression processing for which forcible stoppage cannot be performed is currently processing, it is possible to stop rendering processing based on decompressed data in accordance with a cancel request.

According to a first aspect of the present invention, there is provided an image forming apparatus, comprising: a memory device that stores raster image data corresponding to a background in a compressed format; a generator that generates intermediate data corresponding to a foreground of the background based on obtained print data; a decompressor that decompresses the raster image data stored in the memory device in a compressed format; and a rasterizer that generates new raster image data based on raster data corresponding to the background obtained by the decompression and the generated intermediate data corresponding to the foreground, wherein in a case where a request is made to stop the generation of the new raster image data in a state of waiting for at least a portion of the raster image data corresponding to the background to be decompressed, the rasterizer stops generation of the new raster image data, and the decompressor continues decompressing the at least a portion of the raster image data corresponding to the background.

According to a second aspect of the present invention, there is provided an image forming apparatus, comprising: a memory device that stores a set of instructions; and at least one processor that executes the instructions stored in the memory device to function as: a generation unit configured to generate intermediate data based on print data of a print job; an image processing unit configured to process image data; and a rendering unit configured to, together with rendering an image based on the intermediate data, output after compositing image data rendered based on the intermediate data and image data processed by the image processing unit, wherein in accordance with the generation unit making the cancel request for the print job during execution by the rendering unit of processing for rending after the rendering unit receives the print data of the print job, the rendering unit receives and discards image data processed by the image processing unit, and after outputting unprocessed image data as image data including predetermined pixel data, stops the rendering processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
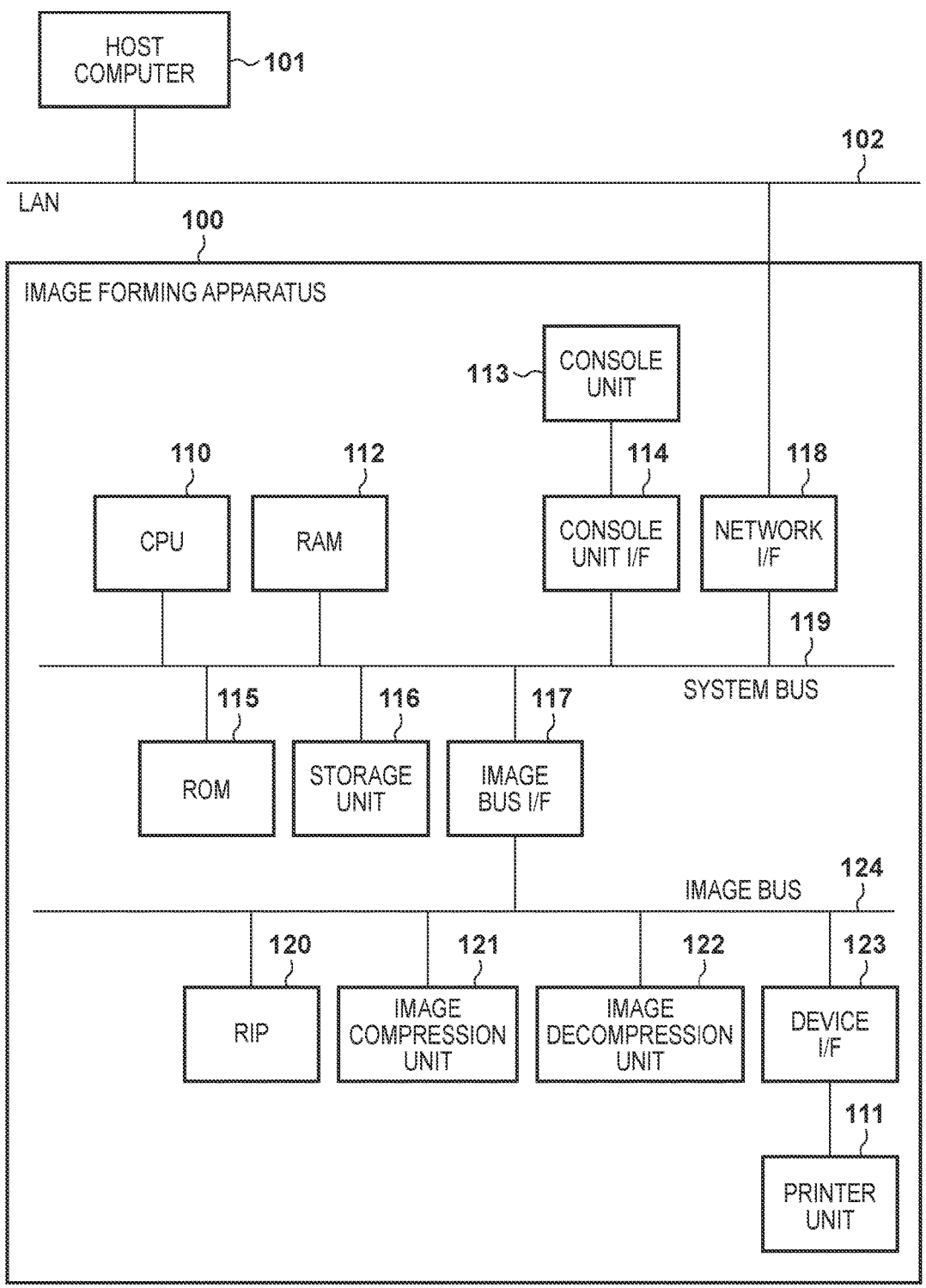
FIG. 1 is a block diagram for describing a configuration of an image forming apparatus according to an embodiment of the present invention.

FIG. 1 is a block diagram for describing a configuration of an image forming apparatus 100 according to the embodiment of the present invention.

The image forming apparatus 100 is connected with a host computer 101 via a LAN 102. A user generates, on the host computer 101, PDL data that indicates information of a page to be printed, and transmits the information to the image forming apparatus 100 via the LAN 102 from the host computer 101. The image forming apparatus 100 according to the embodiment may be a multi-function peripheral (MFP) or any SFP (Single Function Printer). Also, the image forming apparatus 100 may be a printer other than an MFP and an SFP.

The image forming apparatus 100 includes a printer unit (print engine) 111 which is an image output device, for example. Also, the image forming apparatus 100 prints by the printer unit 111 when it receives PDL data (a print job described in page description language) via the LAN 102 from the host computer 101. The printer unit 111 is connected to a device I/F 123, and prints image data generated by a CPU 110 on a sheet (paper). The CPU 110 is a central processing unit for controlling the image forming apparatus 100 overall. A RAM 112 is used as a work memory for the CPU 110 to operate. Also, the RAM 112 has a work region for performing rendering processing and is a memory for temporarily storing obtained PDL data, intermediate data generated by image forming processing, and inputted image data. A ROM 115 is a boot ROM, for example, and stores a boot program of this apparatus. A storage unit 116 is a hard disk drive, for example, and stores programs for various processes, obtained PDL data, image data, and the like. The CPU 110 executes a boot program that is stored in the ROM 115, deploys to the RAM 112 a program that is installed in the storage unit 116, and controls operation of the image forming apparatus 100 by executing the deployed program.

A console unit I/F 114 is an interface unit of a console unit 113 having a display unit for displaying information such as various menus, print data, and the like, and outputs operation screen data to the console unit 113. Also, the console unit I/F 114 conveys to the CPU 110 information that a user inputted via the console unit 113. Note that the console unit 113 may have a touch panel function. A network I/F 118 is an interface for performing an exchange of information with an external apparatus (the host computer 101, for example) via the LAN 102. The CPU 110, the ROM 115, the RAM 112, the storage unit 116, the console unit I/F 114, and the network I/F 118 are connected to a system bus 119.

An image bus I/F 117 is an interface for connecting the system bus 119 and an image bus 124 for transferring image data at high speed, and is a bus bridge for converting data structures. To the image bus 124, an RIP (raster image processor) 120, an image compression unit 121, an image decompression unit 122, and the device I/F 123 are connected. The RIP 120, based on an instruction from the CPU 110, analyzes PDL data code and intermediate data (a display list) and develops them into image data. The image compression unit 121 compresses image data deployed by the RIP 120 in accordance with print processing, and stores the compressed image data (i.e. image data in a compressed format) in the RAM 112 via the image bus I/F 117. The image decompression unit 122 decompresses image data that is stored in the RAM 112, and transfers the decompression result to the RIP 120 and the device I/F 123 via the image bus 124 in accordance with print processing. The device I/F 123 is an interface for transmitting data to the printer unit 111.

Next, description is given of a definition of terms in the embodiments described below.

A scan line is a line in a main scanning direction in which image data is sequentially memory-scanned in image forming processing, and the height of a scan line is one pixel. Also, a plurality of scan lines in a bundle is referred to as a band. Furthermore, each rectangular region into which such a band is divided into plural rectangles is referred to as a block.

Next, image formation processing by the image forming apparatus 100 according to the first embodiment is described with reference to FIG. 2, FIG. 5, and FIG. 6.

Figure 2:
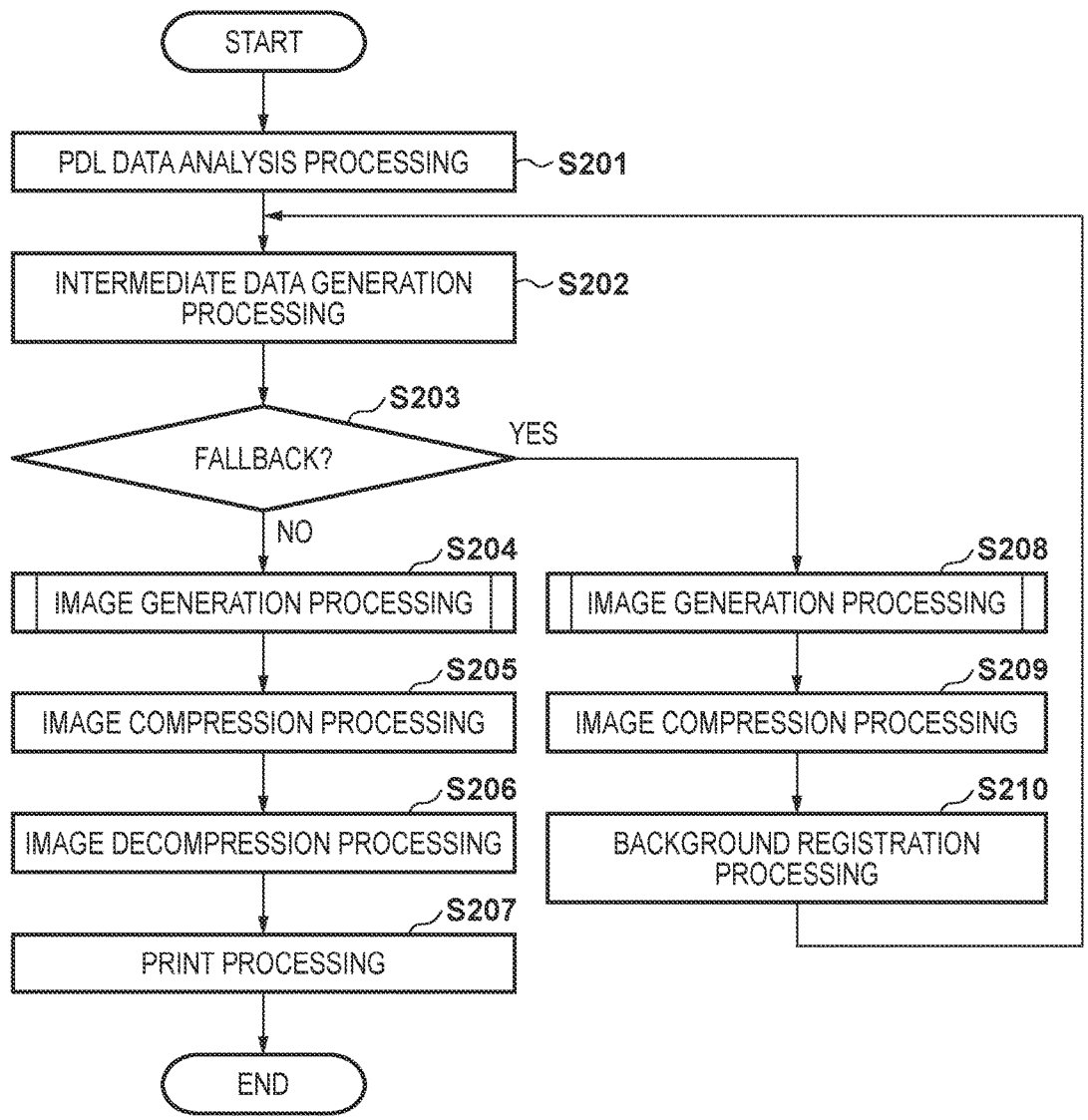
FIG. 2 is a flowchart for describing image formation processing by the image forming apparatus according to a first embodiment.

FIG. 2 is a flowchart for describing image formation processing by the image forming apparatus 100 according to the first embodiment. Note that processing illustrated in this flowchart is realized by the CPU 110 executing a program deployed in the RAM 112.

First, in step S201, the CPU 110 stores PDL data received from the host computer 101 in the storage unit 116, and performs an analysis on that PDL data. Next, step S202 is advanced to, and the CPU 110, based on the information of the analyzed PDL data, performs generation of intermediate data necessary for bitmap image data generation. In such a case, normally, a rendering commands for one page are included in the intermediate data. However, there are cases where the intermediate data generated in step S202 becomes a size that cannot be completely stored in the RAM 112, or cases where the number of rendering commands included in the intermediate data exceeds the maximum value that can be stored. In such cases, bitmap image data is generated in relation to generated intermediate data (hereinafter, fallback processing). Then, in step S203, the CPU 110 determines whether or not fallback processing has been entered, and switches subsequent processing in accordance with the result of that determination.

If in step S203 the CPU 110 determines that the fallback processing has not been entered, the processing advances to step S204. In step S204, the CPU 110, based on the generated intermediate data, instructs the RIP 120 to rasterize. By this, the RIP 120 generates bitmap image data. Then, the processing advances to step S205, and the CPU 110 compresses the bitmap image data generated by the RIP 120 using the image compression unit 121, and stores it into the RAM 112 through the image bus I/F 117. Next, the processing advances to step S206, and the CPU 110 decompresses the compressed image data stored in the RAM 112 using the image decompression unit 122, and transfers to the device I/F 123 the decompressed the bitmap image data via the image bus 124 in accordance with print processing. Then, in step S207, the CPU 110, by the printer unit 111, causes printing in accordance with the bitmap image data.

At that time, the image compression unit 121 and the image decompression unit 122 may be controlled from the RIP 120 or controlled from the CPU 110. Also, the image decompression unit 122 immediately decompresses the compressed image data, but configuration may also be taken such that compressed image data stored in the RAM 112 is first moved to the storage unit 116, and then the compressed image data is decompressed and printed in accordance with an instruction from a user or the like.

Meanwhile, in step S203, the CPU 110 determines that the fallback processing has been entered, and advances the processing to step S208. In step S208, the CPU 110, based on the generated intermediate data, instructs the RIP 120 to rasterize, and the RIP 120 generates bitmap image data. Then, the processing advances to step S209, and the CPU 110 compresses the bitmap image data generated by the RIP 120 using the image compression unit 121, and stores it into the RAM 112 through the image bus I/F 117. Next, the processing advances to step S210, and the CPU 110 makes the compressed image data obtained in step S209 be a background image, and performs background registration processing such that it is possible to generate intermediate data that is composited with a rendering command not included in the intermediate data in step S202 prior to entering the fallback processing. Accordingly, in step S202 after executing step S210, a rendering command that is used by decompressing compressed image data stored in the RAM 112 ends up being included in the intermediate data.

Figure 5:
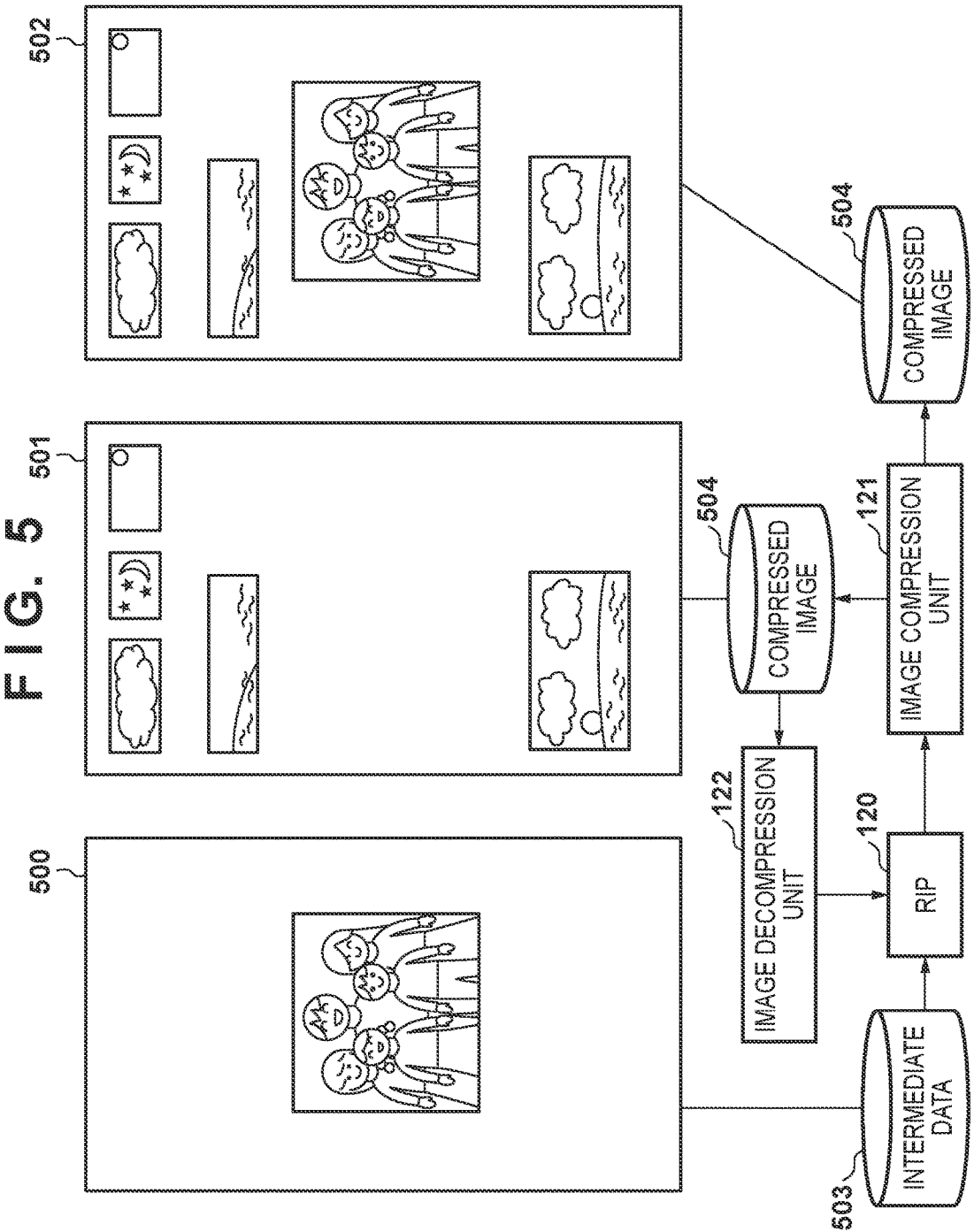
FIG. 5 depicts a view for describing dataflow for a time of fallback processing according to embodiments.

FIG. 5 depicts a view for describing dataflow for a time of fallback processing according to embodiments.

In FIG. 5, there is a rendering command for rendering an image 500 in intermediate data 503, and there is a bitmap image 501 that is compressed as a compressed image 504. The RIP 120 generates a composited bitmap image 502 into which the image 500 and the bitmap image 501 are composited.

Next, the image generation processing of step S204 and step S208 of FIG. 2 is described with reference to the flowcharts of FIG. 3 and FIG. 4.

Figure 3:
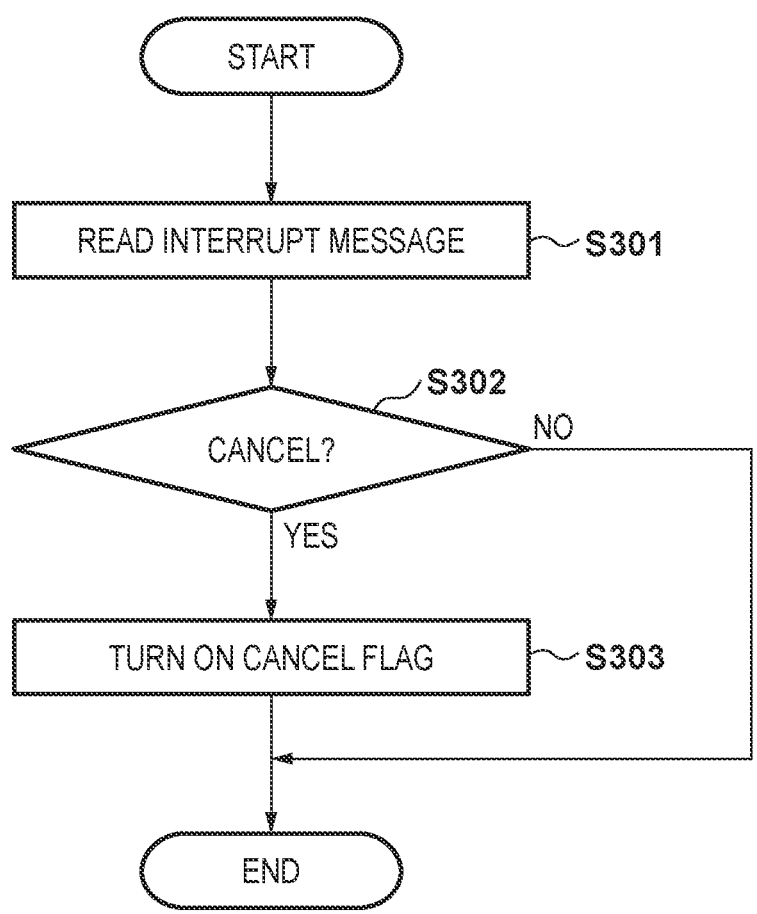
FIG. 3 is a flowchart for describing processing according to an interrupt handler for when an RIP of the image forming apparatus according to the first embodiment receives an interrupt message.

FIG. 3 is a flowchart for describing processing according to an interrupt handler for when the RIP 120 of the image forming apparatus 100 according to the first embodiment receives an interrupt message. This is described later together with processing for a case in which the CPU 110 instructs the RIP 120 to stop generation of bitmap image data.

Figure 4:
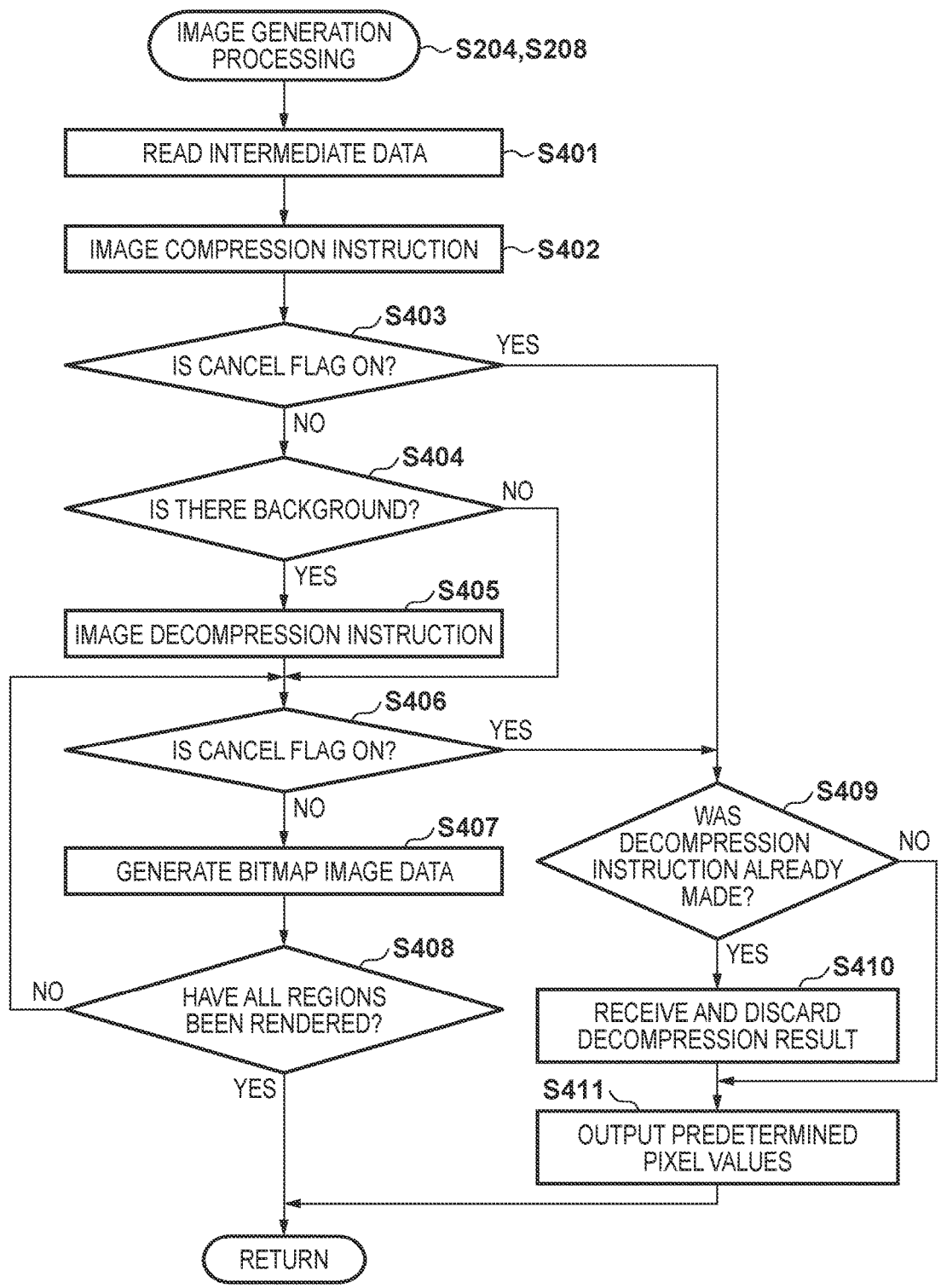
FIG. 4 is a flowchart for describing processing of an RIP after original processing is returned to from the interrupt handler of FIG. 3.

FIG. 4 is a flowchart for describing processing of the RIP 120 after original processing is returned to from the interrupt handler of FIG. 3.

In FIG. 3, first, in step S301, the RIP 120 reads an interrupt message from the CPU 110. Next, the processing advances to step S302, the RIP 120 determines whether or not the interrupt message from the CPU 110 is a cancellation instruction, and if it is the cancellation instruction, the processing advances to step S303, and the RIP 120 turns on a cancel flag, and executes cancellation processing. In step S303, the RIP 120 turns on a cancel flag of a predetermined register in the RIP 120 or the RAM 112. Also, in step S302, in a case where there is no cancellation instruction, the original processing is returned to from the interrupt handler without performing any processing.

Next, the flowchart of FIG. 4 will be described.

First, in step S401, the RIP 120 reads intermediate data generated in step S202 of FIG. 2. Next, the processing advances to step S402, and the RIP 120 instructs the image compression unit 121 to compress the bitmap image data that is generated. More specifically, from an instruction included in the intermediate data read in step S401, an address of the RAM 112 at which width and height information of the bitmap image data that is generated, color space information, and the compressed image are stored is set in the image compression unit 121. Next, the processing advances to step S403, and the RIP 120 determines whether or not the cancel flag is on. Here, if the cancel flag is on, the processing advances to step S409, and if not, the processing advances to step S404.

In step S404, the RIP 120 determines whether or not a background is registered in the intermediate data. In a case of the intermediate data generated in step S202 after step S210 of FIG. 2, a background is registered in the intermediate data. Accordingly, when a background is registered in the intermediate data, the processing advances step S405, the RIP 120 instructs the image decompression unit 122 to start decompressing the compressed image data stored in the RAM 112 so that it is possible to use the registered background, and the processing advances to step S406. Also, when, in step S404, a background is not registered in the intermediate data, the processing advances to step S406.

In step S406, the RIP 120, similarly to in step S403, determines whether or not the cancel flag is on, and in a case where the cancel flag is off, specifically, there is no cancellation instruction, the processing advances to step S407. In step S407, the RIP 120 generates bitmap image data in which rendering commands included in intermediate data and the decompression result received from the image decompression unit 122 are composited. At that time, the RIP 120 receives the result of decompression from the image decompression unit 122 via the image bus 124. Then, the processing advances to step S408, and the RIP 120 determines whether or not the rendering of all regions has ended, and when it has not ended, the processing advances to step S406. Then, when the rendering of all regions ends, this processing is ended. Accordingly, the image decompression unit 122 does not write the decompression result out to the RAM 112. In this way, the RIP 120 repeats the processing from step S406 to step S408 until bitmap image data of all regions of the width and height designated by the intermediate data is generated.

Also, the image decompression unit 122, in accordance with the decompression instruction of step S405, provides the result of decompression according to units in which the bitmap image data of the RIP 120 is generated. For example, in a case where the RIP 120 generates bitmap image data for each scan line, the image decompression unit 122 provides the background image of the scan line in one pixel units or in one scan line units as the decompression result. In the case where the RIP 120 generates bitmap image data in one block units, the image decompression unit 122 decompresses the background image of the block in one pixel units or one block units, and provides the result thereof. Here, the image decompression unit 122 provides the decompression result of the next region after the RIP 120 receives the decompression result.

Figure 6:
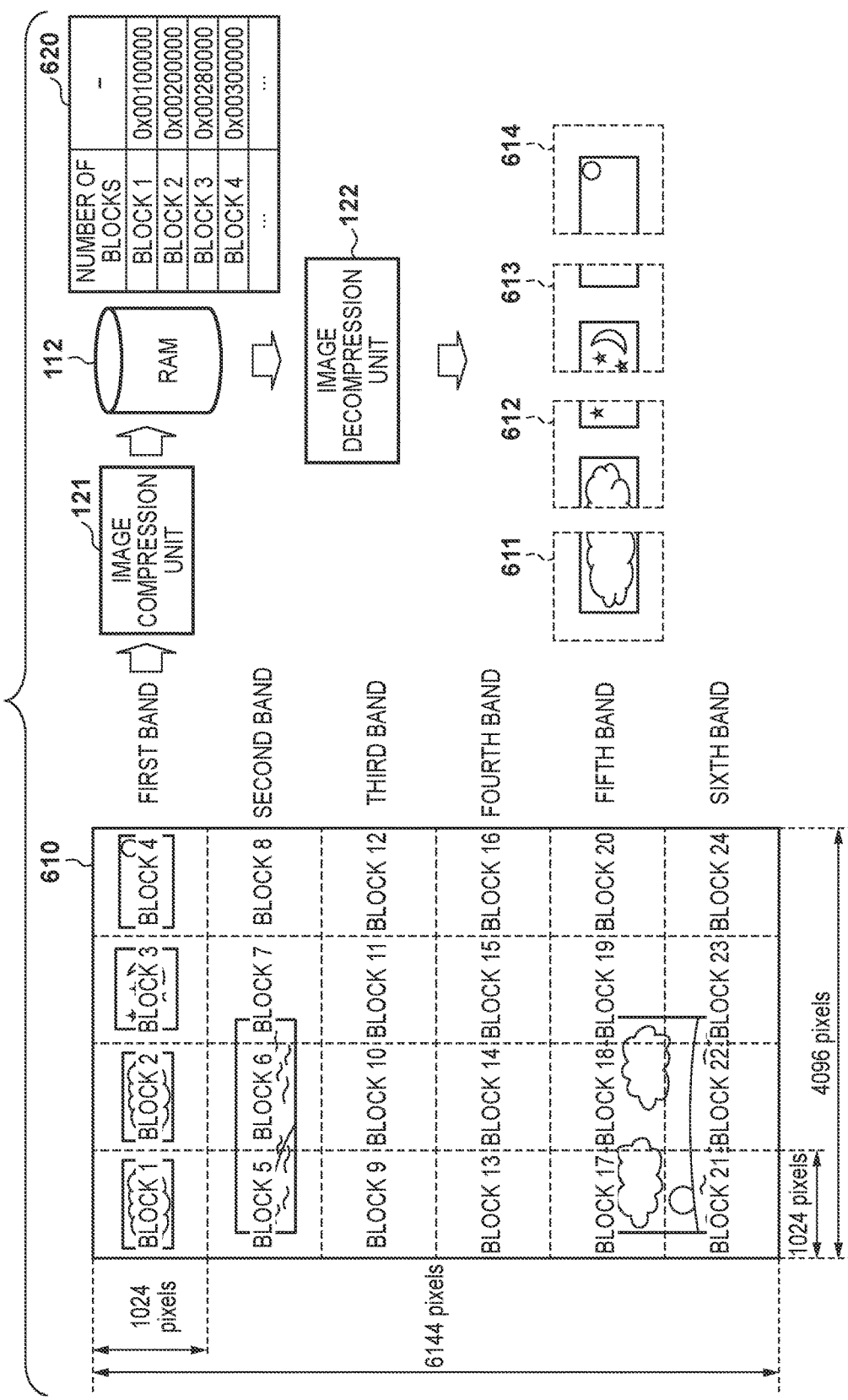
FIG. 6 depicts a view for describing an example of decompression processing in the image forming apparatus according to the first embodiment.

FIG. 6 depicts a view for describing an example of decompression processing in the image forming apparatus 100 according to the first embodiment.

Bitmap image data 610 is bitmap image data that the RIP 120 generates, and this image data 610 indicates the page width and height of the bitmap image data, the band width and height, and the block width and height that the RIP 120 generates. In such a case, the RIP 120 is configured to generate bitmap image data in order for each block region, but configuration is such that generation for each band, or in one scan line units from the top of the page is possible.

The image compression unit 121 compresses bitmap image data generated for each block region by the processing indicated in FIG. 3 and FIG. 4 of the RIP 120, and stores the compressed image data sequentially in the RAM 112, and ultimately the compressed image data for one page is stored. In such a case, the image compression unit 121 stores compressed image data in a predetermined region of the RAM 112 that is assigned in advance, but a management table 620 which manages the storage destinations of the compressed image data of each block is generated in a predetermined region of the RAM 112. Also, at the head of the management table 620, the number of blocks that are managed by the management table 620 is stored.

The image decompression unit 122 decompresses sequentially the compressed image data stored in the RAM 112 for each block. The image decompression unit 122, prior to decompression, is set, from the RIP 120, with a location (address) of the management table 620 of the block to be decompressed in a predetermined region of the RAM 112, and starts decompression upon a start instruction by the RIP 120. The image decompression unit 122 decompresses the compressed image data for each block, and when reception of a block that the RIP 120 decompressed completes, image data of the next block is decompressed, and this processing is repeated for each of the blocks managed by the management table 620. By this, the RIP 120 receives a background image of a necessary unit (block) at the necessary timing when bitmap image data is generated from the intermediate data.

Reference numerals 611 to 614 of FIG. 6 denote examples of image data of blocks 1 to 4 of a first band of the bitmap image data 610.

In the image forming apparatus 100 according to the embodiments, the RIP 120 and the image decompression unit 122 are connected by the image bus 124 as illustrated in FIG. 1. When the RIP 120 stops operation when the image decompression unit 122 decompresses the image data, image data during decompression or after decompression is left in the image bus 124 or the image decompression unit 122. By this, when next the RIP 120 operates, erroneous data that was left in the image bus 124 and the image decompression unit 122 ends up being received.

Next, processing in a case in which the CPU 110 instructs the RIP 120 to stop generation of the bitmap image data during processing of FIG. 3 and FIG. 4 will be described with reference to FIG. 3, FIG. 4, and FIG. 7. Note that the CPU 110, by using an interrupt message to the RIP 120, instructs the RIP 120 to stop generation of the bitmap image data.

Figure 7:
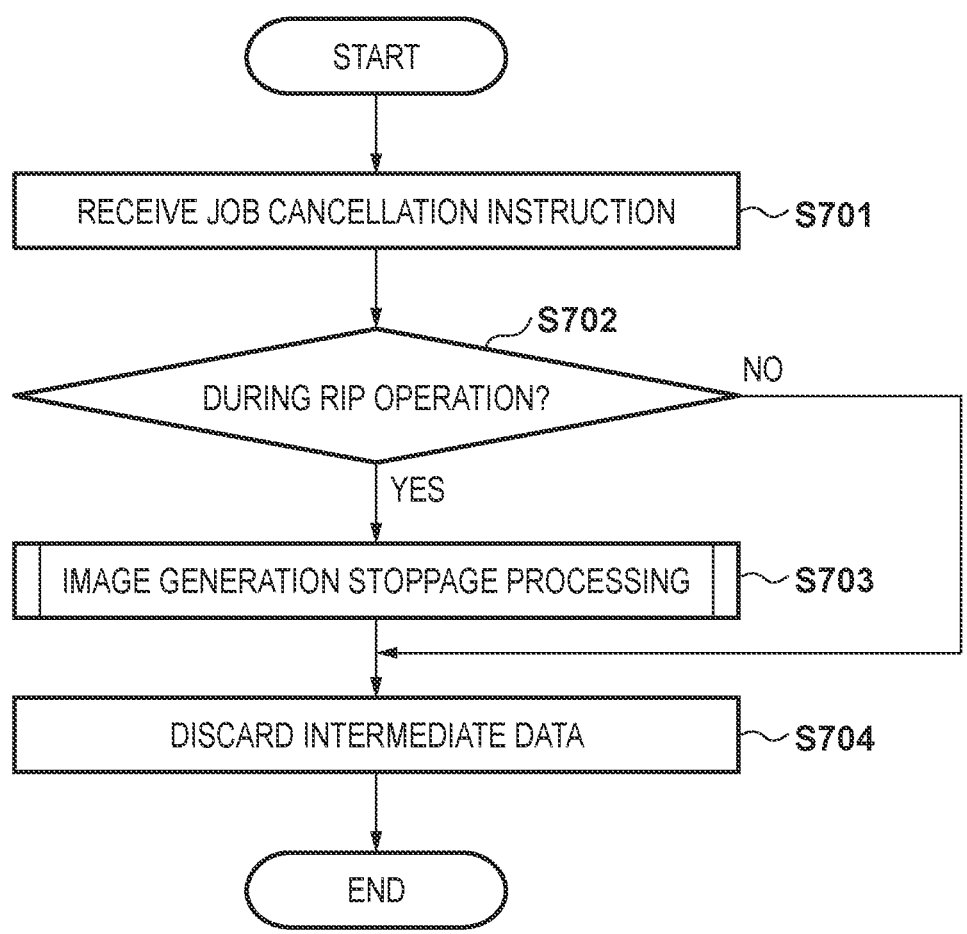
FIG. 7 is a flowchart for describing stoppage processing at a time of image processing by the image forming apparatus according to the first embodiment.

FIG. 7 is a flowchart for describing stoppage processing at a time of image processing by the image forming apparatus 100 according to the first embodiment. Note that processing illustrated in this flowchart is realized by the CPU 110 executing a program deployed in the RAM 112.

First, in step S701, the CPU 110 receives a job cancellation instruction from a user. Regarding this job cancellation instruction, a user instructs the job cancellation via the console unit 113, and the CPU 110 receives the job cancellation via the console unit I/F 114. Alternatively, the job cancellation is instructed from the host computer 101 by a user, and is received by the CPU 110 via the LAN 102 and the network I/F 118. Then the processing advances to step S702, and the CPU 110 determines whether or not the processing to generate image data for the job for which the cancel instruction was received has been started. Here, in a case where the RIP 120 is already operating and processing to generate image data has started, the processing advances to step S703, and the CPU 110 instructs the RIP 120 to stop. By this, the RIP 120 executes the processing of FIG. 3, and receives the interrupt message from the CPU 110. Then, when the RIP 120 receives this interrupt message, it executes processing in accordance with the message content in the interrupt handler. Note that the processing for stopping image generation of the RIP 120 according to step S703 is described later with reference to the flowchart of FIG. 4. Next, the processing advances to step S704, and the CPU 110 discards the intermediate data in the RAM 112 related to the job for which the cancellation instruction was received that is being generated or is already generated, and ends this processing.

In step S403 and in step S406 of FIG. 4, the RIP 120 determines whether or not the cancel flag in a predetermined register in the RIP 120 or the RAM 112 is on. Here, when the cancel flag is determined to be on, the processing advances to step S409. In step S409, the RIP 120 determines whether or not the image data decompression instruction was already outputted to the image decompression unit 122. In the case where the decompression instruction was already outputted, the processing advances to step S410, and the RIP 120 receives all decompressed data that was instructed. In such a case, that received data is discarded without composition as a background image, and the processing advances to step S411. Also, when, in step S409, the RIP 120 has not outputted an image data decompression instruction to the image decompression unit 122, the processing advances to step S411. In step S411, the RIP 120 makes the pixel values of the region for which processing in the page has not been completed a color value that was decided in advance, and outputs it to the image compression unit 121, for example, of the subsequent stage.

As described above, by virtue of the first embodiment, it is possible to safely stop processing even when a cancellation instruction is inputted while a rendering processing module (RIP), which is for rendering based on data that was processed by an image processing module (image decompression unit) for which forcible stoppage cannot be performed, is currently executing processing.

Second Embodiment

Next, description will be given for the image forming apparatus 100 according to a second embodiment of the present invention. Note that the hardware configuration of the image forming apparatus 100 according to the second embodiment and the software configuration in the image forming apparatus 100 are the same as in the previously described first embodiment, and so description thereof will be omitted.

Figure 8:
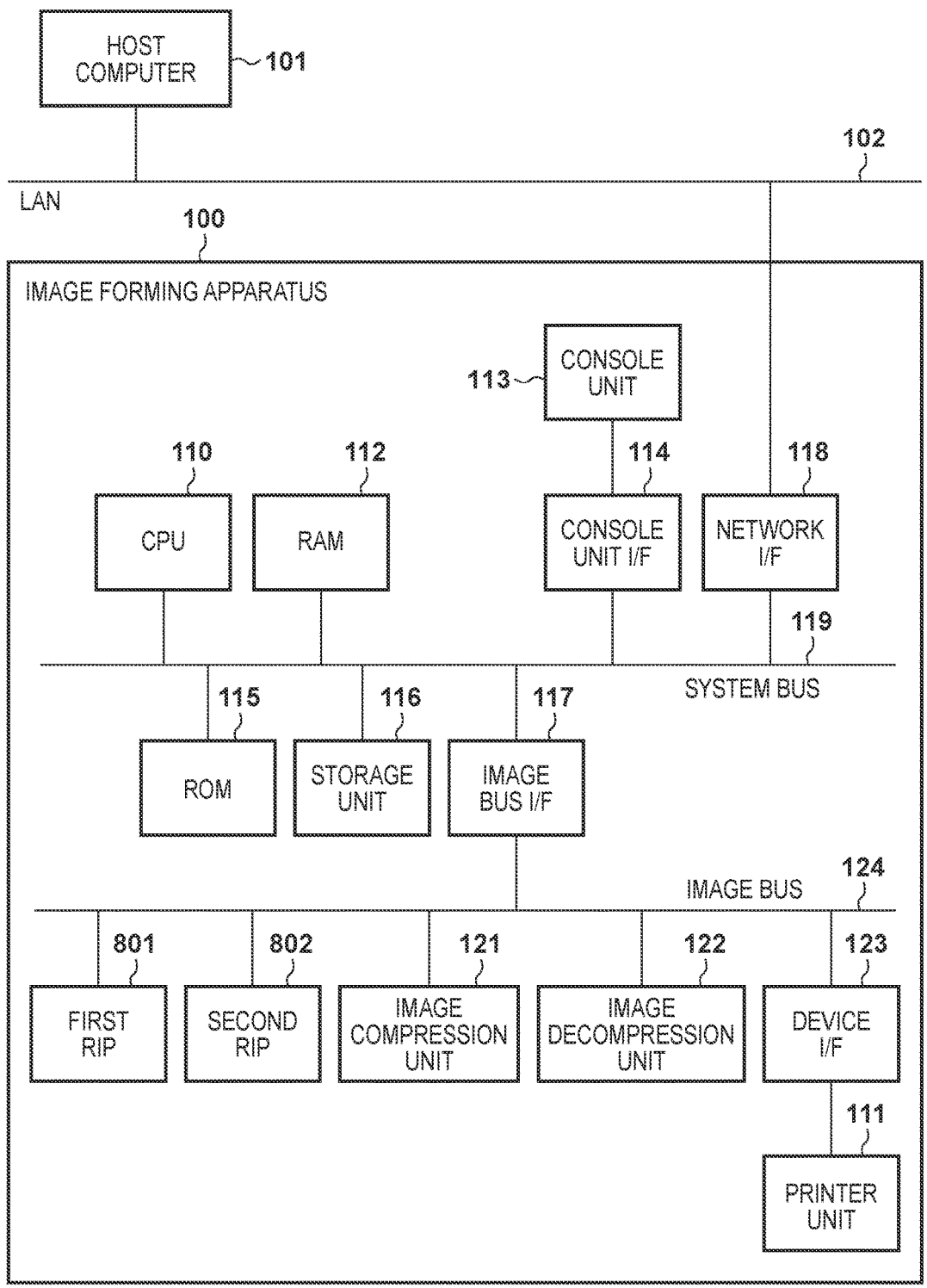
FIG. 8 is a block diagram for describing a configuration of an image forming apparatus according to a second embodiment of the present invention.

FIG. 8 is a block diagram for describing a configuration of the image forming apparatus 100 according to the second embodiment of the present invention. In FIG. 8, configurations that are the same as in the previously described FIG. 1 are indicated by the same reference numerals, and description thereof is omitted.

There is a difference from the configuration of the previously described first embodiment in that in this image forming apparatus 100, a first RIP 801 and a second RIP 802 are connected to the image bus 124.

Both RIPs, based on an instruction from the CPU 110, analyze PDL data code and intermediate data, and develop it into image data. The first RIP 801 and the second RIP 802 perform processing by dividing regions they are in charge of for one page of a width and height designated in the intermediate data. In the second embodiment, for each block indicated in FIG. 6, the first RIP 801 is in charge of the top region (width 1024×height 512 (pixels)) of the block and the second RIP 802 is in charge of the bottom portion (width 1024×height 512 (pixels)) of the block.

Figure 9:
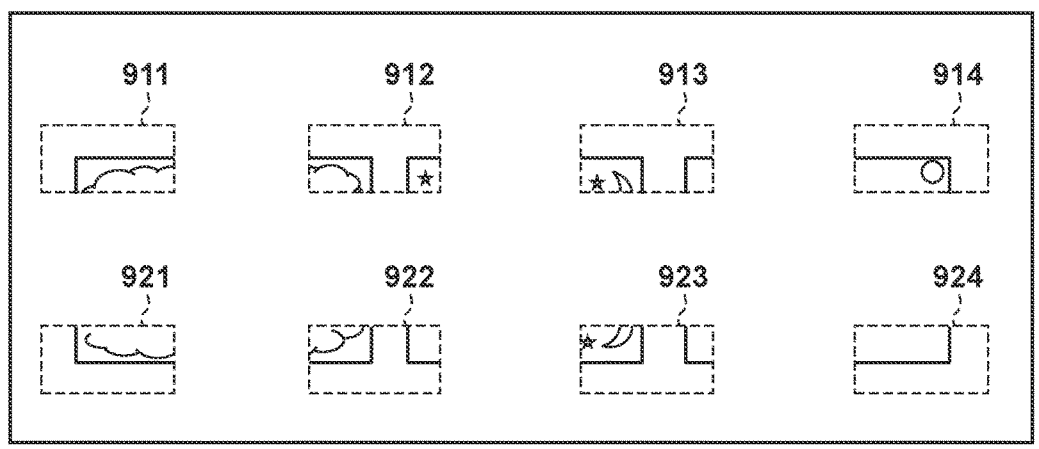
FIG. 9 depicts a view for describing regions divided between a first RIP and a second RIP of the image forming apparatus according to the second embodiment.

FIG. 9 depicts a view for describing regions divided between the first RIP 801 and the second RIP 802 of the image forming apparatus 100 according to the second embodiment.

A region 911 and a region 921 are image regions rendered for block 1 of FIG. 6, and the first RIP 801 is in charge of the region 911 which is positioned in the top portion of the block 1, and the second RIP 802 is in charge of the region 921 which is positioned in the bottom portion of the block 1. Regions 912 to 914 and 922 to 924 are similarly divided, and the first RIP 801 and the second RIP 802 generate image data such that together one block is produced.

The flowchart of the image forming processing in the image forming apparatus 100 according to the second embodiment is the same as in previously described FIG. 2 other than the processing of step S204 and step S208 of FIG. 2, and so description thereof is omitted.

Figure 10:
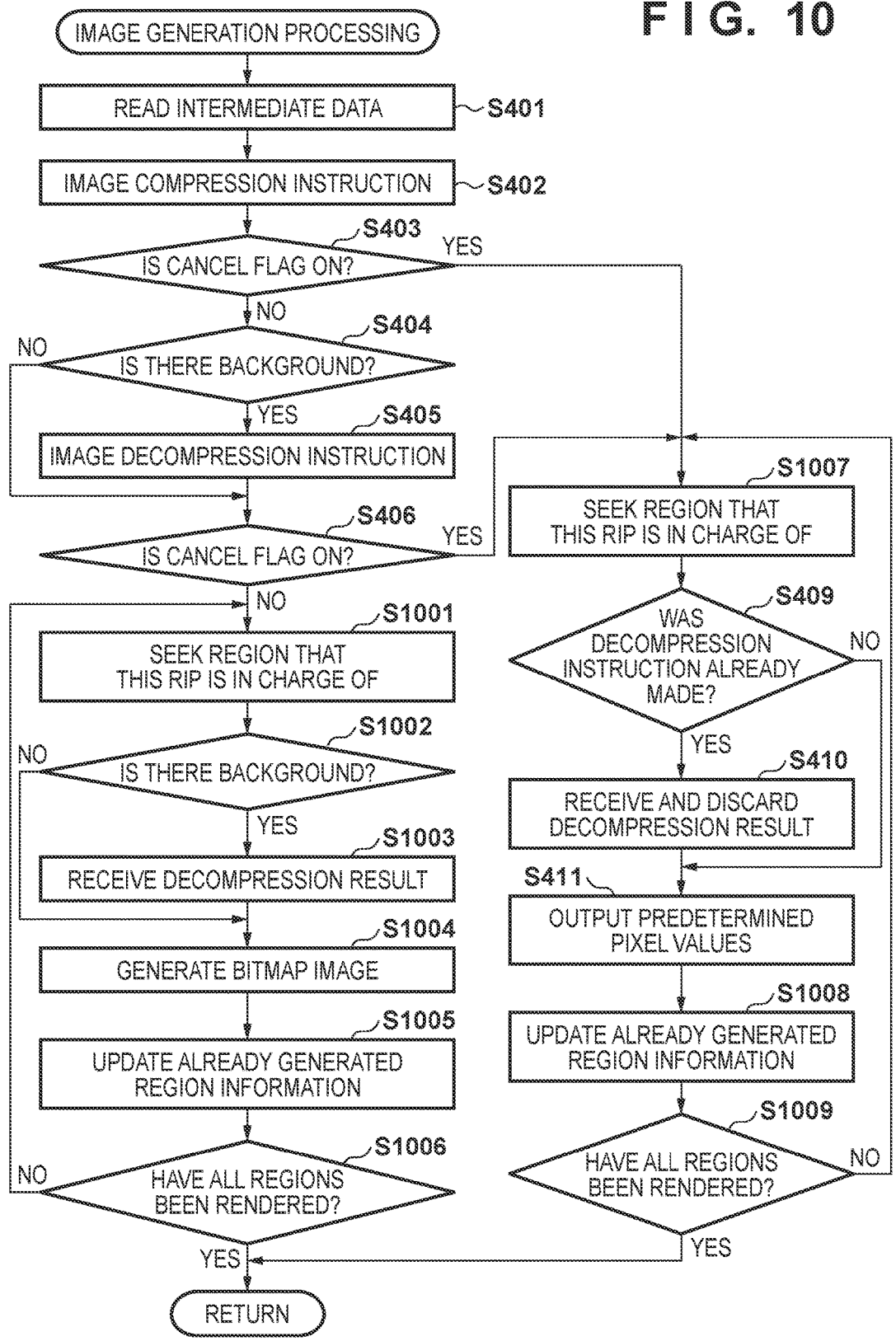
FIG. 10 is a flowchart for describing image generation processing of step S204 and step S208 of the aforementioned FIG. 2 by the first RIP of the image forming apparatus according to the second embodiment.

FIG. 10 is a flowchart for describing image generation processing of step S204 and step S208 of the previously described FIG. 2 by the first RIP 801 of the image forming apparatus 100 according to the second embodiment.

Figure 11:
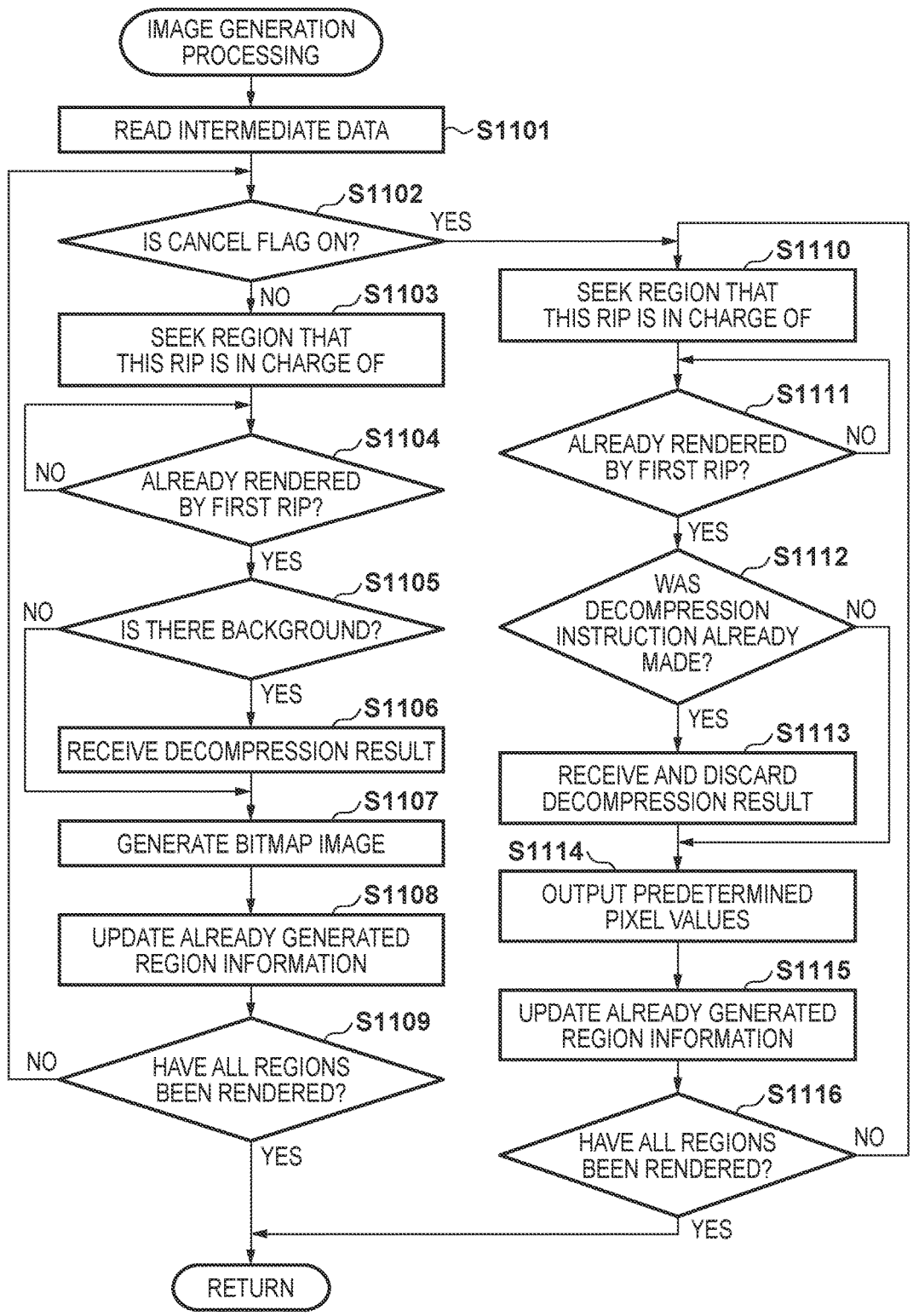
FIG. 11 is a flowchart for describing image generation processing of step S204 and step S208 of the aforementioned FIG. 2 by the second RIP of the image forming apparatus according to the second embodiment.

Also, FIG. 11 is a flowchart for describing image generation processing of step S204 and step S208 of the aforementioned FIG. 2 by the second RIP 802 of the image forming apparatus 100 according to the second embodiment. Note that processing according to an interrupt handler for when an interrupt message is received according to the first RIP 801 and the second RIP 802 is the same as in the flowchart of previously described FIG. 3, and a flowchart and description thereof are omitted.

First, with reference to FIG. 10, image generation processing of step S204 and step S208 by the first RIP 801 of the image forming apparatus 100 according to the second embodiment will be described. Note that in FIG. 10, portions that are common to the previously described FIG. 4 are indicated by the same reference numerals, and description thereof is omitted.

When, in step S406, the cancel flag is off, the processing advances to step S1001, and the first RIP 801, based on the intermediate data read in step S401, seeks a rendering region that the second RIP 802 is not in charge of and that the first RIP 801 is in charge of. Next, the processing advances to step S1002, and the first RIP 801 determines whether or not there is a background image to be composited in the generation of the bitmap image data. When it is determined here that there is the background image, the processing advances to step S1003, the first RIP 801 receives the decompressed result from the image decompression unit 122, and the processing advances to step S1004. Also, when it is determined in step S1002 that there is no background image, the processing advances to step S1004.

In step S1004, the first RIP 801 generates bitmap image data in accordance with a rendering command included in the intermediate data for the rendering region that it is in charge of. At that time, the first RIP 801, in a case where it has instructed the image decompression unit 122 to decompress an image, discards image data of a region that the first RIP 801 is not in charge of among the decompression results for one block according to a rendering region received from the image bus 124. Configuration may be such that at that time, the image decompression unit 122 transfers to the first RIP 801 via the image bus 124 image data only for a region that the first RIP 801 is in charge of in the one block. Then, the processing advances to step S1005, and the first RIP 801 updates the region information that the first RIP 801 is in charge of after bitmap image data generation has completed. More specifically, it counts the number of blocks for which generation of the bitmap image data has completed. Then, the processing advances to step S1006, the first RIP 801 determines whether or not the rendering of all regions has ended, and repeats the processing from step S1001 to step S1006 until generation of bitmap image data of all regions of the width and height designated by the intermediate data has completed.

Meanwhile, when the cancel flag is on in step S406, the processing advances to step S1007, and the first RIP 801, similarly to in step S1001, seeks a rendering region that the second RIP 802 is not in charge of and that the first RIP 801 is in charge of, based on the intermediate data read in step S401. Next, in step S409 to step S410, the first RIP 801 receives the decompressed data, and discards it. Then, in step S411, the first RIP 801 outputs the pixel values of an unprocessed region for which processing in the page has not completed as a color value that is determined in advance. Then, the processing advances to step S1008, and the first RIP 801 updates the region information that the first RIP 801 is in charge of for which the rendering processing has completed. Then, when it is determined in step S1009 that the rendering processing for all regions has not completed, the processing returns to step S1007, and the processing from step S1007 until step S1006 repeats until generation and discarding of bitmap image data for all regions of the width and height designated by the intermediate data has completed.

FIG. 11 is a flowchart for describing processing of the second RIP 802 according to the second embodiment. Note that here, since the first RIP 801 has made an instruction to compress the bitmap image data that is generated to the image compression unit 121, the second RIP 802 does not make an instruction. Similarly, the second RIP 802 does not make a decompression instruction to the image decompression unit 122.

In step S1101, the second RIP 802 reads the intermediate data, the processing advances to step S1102, and the second RIP 802 determines whether or not the cancel flag is on. It is determines here that the flag is not on, the processing advances to step S1103, and if it determines that the flag is on, the processing advances to step S1110. In step S1103, the second RIP 802 seeks a rendering region that the first RIP 801 is not in charge of and that the second RIP 802 is in charge of, based on the intermediate data read in step S1101. Next, the processing advances to step S1104, and the second RIP 802 determines whether or not a block to be rendered from among the regions that it is in charge of which were calculated in step S1103 is already rendered by the first RIP 801. By this, the image decompression unit 122, without conforming to the progress of the first RIP 801 and the second RIP 802, can output to both simultaneously the decompression result to be transferred in accordance with an instruction from the first RIP 801. Also, it is possible for the second RIP 802 to output to the image decompression unit 122 the remaining regions in accordance with the output of the first RIP 801 to the image decompression unit 122.

Then, when it is determined that rendering by the first RIP 801 is complete, the processing advances to step S1105, and the second RIP 802 determines whether or not there is a background image to be composited in the generation of the bitmap image data. When it is determined here that there is the background image, the processing advances to step S1106, the second RIP 802 receives the decompressed result from the image decompression unit 122, and the processing advances to step S1107. In the second embodiment, the second RIP 802 receives a decompression result for one block according to a rendering region via the image bus 124, and discards image data of regions that the second RIP 802 is not in charge of. Also, when it is determined in step S1105 that there is no background image, the processing advances to step S1107. In step S1107, the second RIP 802 generates bitmap image data in accordance with a rendering command included in the intermediate data for the rendering region that the second RIP 802 is in charge of. Then, the processing advances to step S1108, and the second RIP 802 updates the region information that the second RIP 802 is in charge of among the image data for which generation has completed. Specifically, it counts the number of blocks of image data for which generation has completed. In this way, the second RIP 802 repeats the processing from step S1102 to step S1109 until generation of bitmap images for all regions of the width and height designated by the intermediate data has completed.

Next, description is given of processing for a case in which, during the processing of FIG. 10 to FIG. 11, the CPU 110 instructs the first RIP 801 and the second RIP 802 to stop bitmap image generation.

Processing of the CPU 110 in such a case is not different to that of the flowchart of FIG. 7 other than the instruction to stop generation of the bitmap image data by using an interrupt message to the first RIP 801 and the second RIP 802, and therefore description thereof will be omitted.

When the first RIP 801 and the second RIP 802 receive an interrupt message, they execute the processes of FIG. 10 and FIG. 11 respectively, and when that is completed, they return to the processing they were originally performing.

With reference to FIG. 11, the processing of the second RIP 802 will be described.

In step S1102, the second RIP 802 determines whether or not the cancel flag in the predetermined register in the second RIP 802 or memory is on. In the case of the cancel flag is on, the processing advances to step S1110, and the second RIP 802 seeks a region that it is in charge of. Next, the processing advances to step S1111, and the second RIP 802 determines whether or not a block to be rendered from among the regions that it is in charge of which were calculated in step S1110 was already rendered by the first RIP 801. When it is determined that the block has already been rendered, the processing advances to step S1112, and the second RIP 802 determines whether or not the first RIP 801 already outputted the decompression instruction to the image decompression unit 122. In the case of the decompression instruction was already outputted, the processing advances to step S1113, the decompression result is received, and the processing advances to step S1114. In such a case, the received decompressed data is discarded without composition as a background image. Also, in step S1112, when the decompression instruction has not been outputted, the processing advances to step S1114. In step S1114, the second RIP 802 outputs an amount proportional to the number of pixels of the region as a color value that is decided in advance. Then, the processing advances to step S1115, and the second RIP 802 updates the region information that the second RIP 802 is in charge of for which the above-described processing has completed. Specifically, it counts the number of blocks for which rendering processing has completed. In this way, the second RIP 802 repeats the processing from step S1110 to step S1116 until the bitmap image data rendering processing for all regions of the width and height designated by the intermediate data has completed.

As described above, by virtue of the second embodiment, even in the case where there are a plurality of rendering processing modules, and each operates concurrently, and image data from an image processing module that cannot be forcibly stopped is being processed, it is possible to safely stop in accordance with a job cancellation request.

Third Embodiment

The image forming apparatus of a third embodiment according to the present invention will be described. The device configuration of the third embodiment is the same as the configuration of first embodiment. Description regarding portions of the software configuration in the image forming apparatus 100 that are the same as in first embodiment is omitted.

Figure 12:
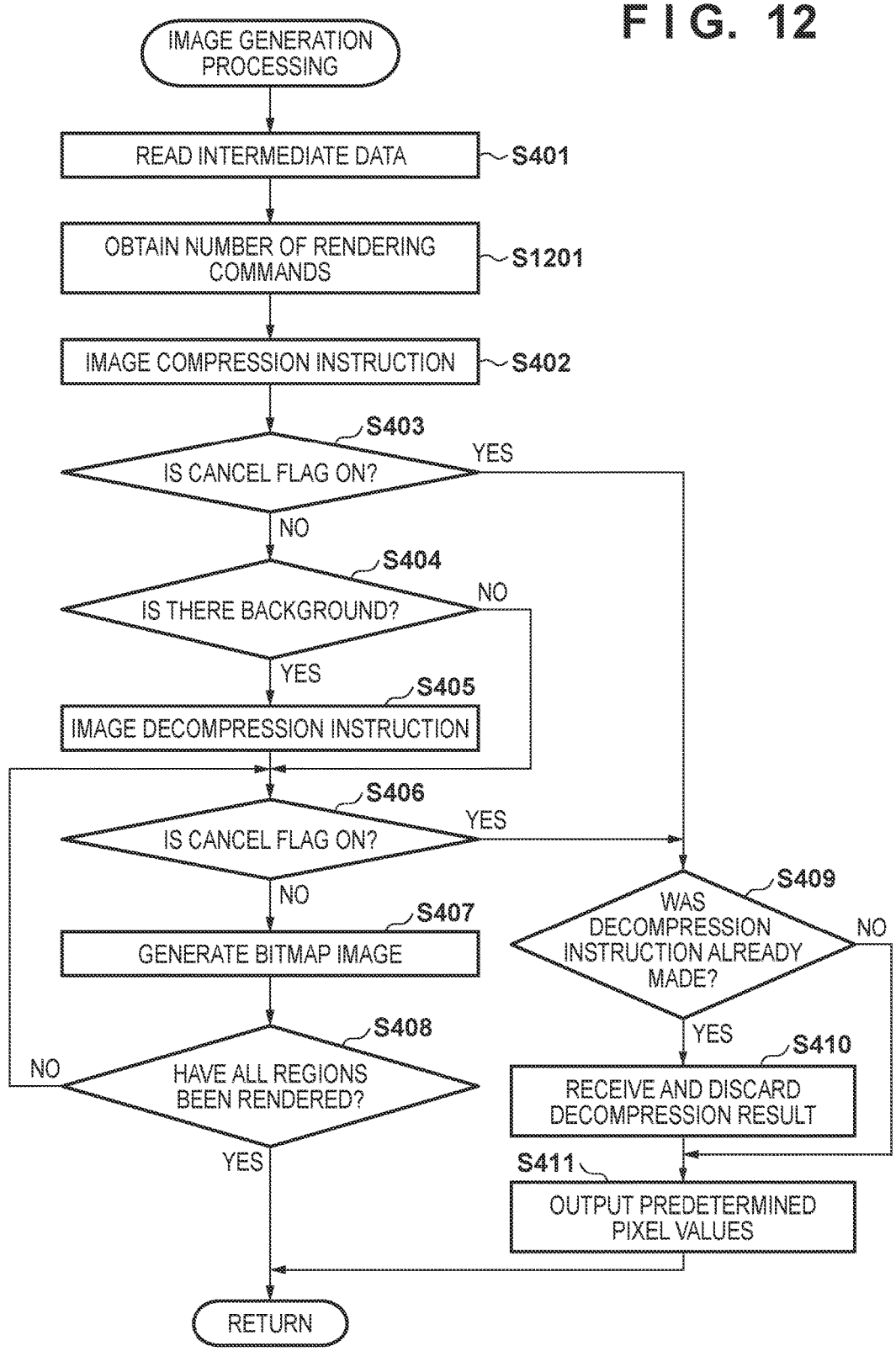
FIG. 12 is a flowchart for describing RIP processing by the image forming apparatus according to a third embodiment.

FIG. 12 is a flowchart for describing processing of the RIP 120 by the image forming apparatus 100 according to the third embodiment.

In step S401, the RIP 120 reads intermediate data generated in step S202 of FIG. 2. Next, the processing advances to step S1201, and the RIP 120 obtains the number of rendering commands in the intermediate data. Also, since the processing from step S1201 is the same as the processing of previously described FIG. 4, the same reference numerals as in FIG. 4 will be used, and description thereof is omitted.

For the processing in the case where the CPU 110 instructs the RIP 120 to stop generating bitmap image during the processing of FIG. 12, the RIP 120, similarly to in first embodiment, receives an interrupt message from the CPU 110 and executes stoppage processing. In such a case, the RIP 120 receives an interrupt message and executes the processing of FIG. 13.

Figure 13:
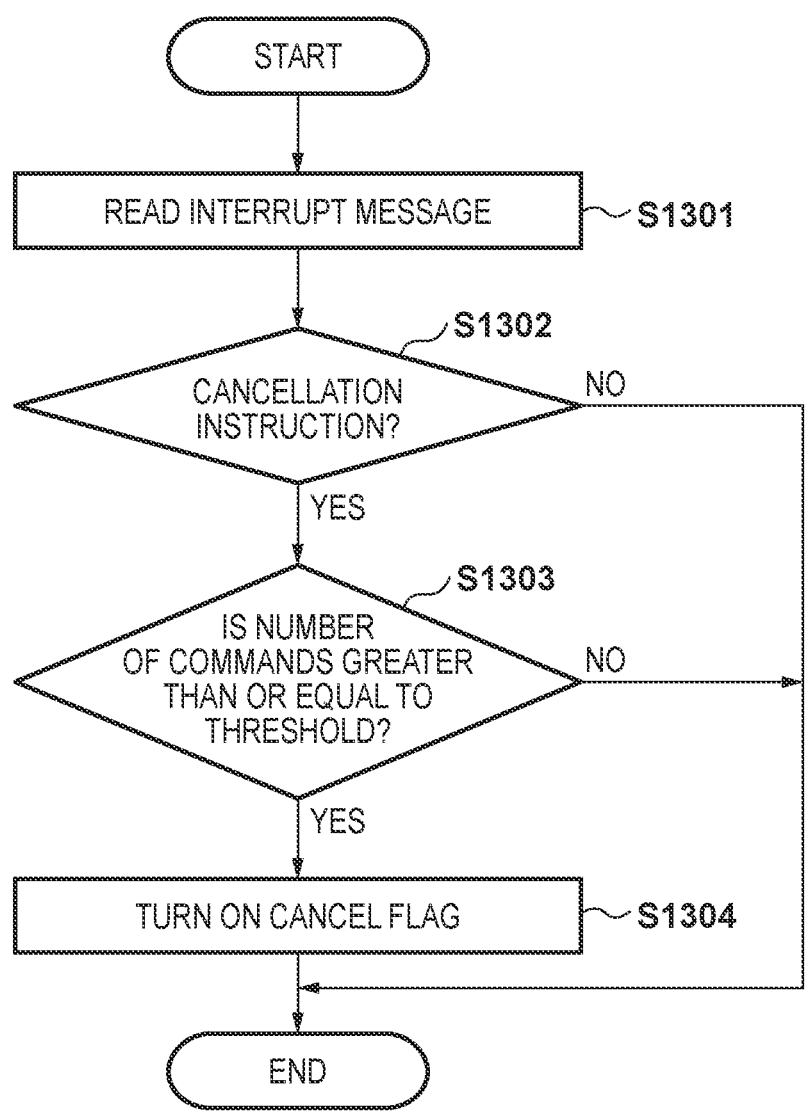
FIG. 13 is a flowchart for describing interrupt processing of an RIP of the image forming apparatus according to the third embodiment.

FIG. 13 is a flowchart for describing interrupt processing of the RIP 120 by the image forming apparatus 100 according to the third embodiment.

In step S1301, the RIP 120 reads an interrupt message from the CPU 110. Next, the processing advances to step S1302, the RIP 120 determines whether or not the interrupt message from the CPU 110 is a cancellation instruction, and if it is the cancellation instruction, the processing advances to step S1303, and the RIP 120 executes cancellation processing. Also, in a case where there is no cancellation instruction, the original processing is returned to from the interrupt handler without performing any processing. In step S1303, the RIP 120 determines whether or not the number of rendering commands in the intermediate data obtained in step S1201 of FIG. 12 is greater than or equal to a predetermined threshold. When it is determined that the number of rendering commands is greater than or equal to the predetermined threshold, the processing advances to step S1304, and the RIP 120 turns on the cancel flag in a predetermined register in the RIP 120 or a memory. The threshold used in this determination is specifically the number of rendering objects in the intermediate data.

Figure 14A:
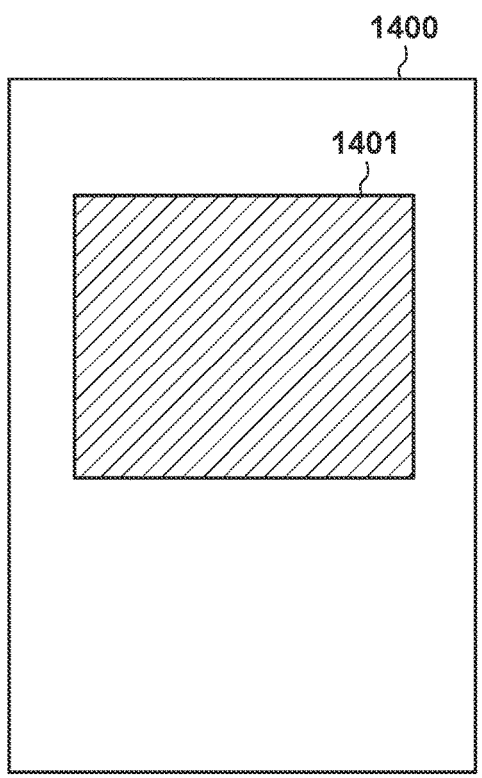
FIGS. 14A and 14B depict views for describing an example of a rendering object according to the third embodiment.
Figure 14B:
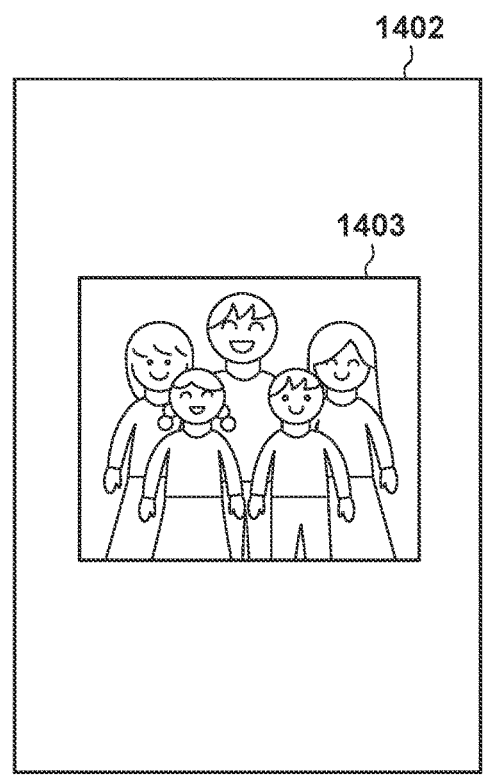

FIG. 14A and FIG. 14B depict views for describing an example of rendering objects according to a third embodiment.

For example, in a case where only a rectangular rendering object 1401 and an image 1403 are present in the rendering regions 1400 and 1402 of the page width and height designated in the intermediate data as illustrated in FIGS. 14A and 14B, the cancel flag is not turned on. Specifically, in a case where the number of rendering objects is less than the threshold, the cancel flag is not turned on. This threshold can be set to a predetermined value in accordance with the capabilities of the RIP 120, and for example, is set to a predetermined value so that the speed of bitmap image data generation by the RIP 120 exceeds the performance of the image compression unit 121.

As described above, by virtue of the third embodiment, it is possible to safely stop processing even when a cancellation instruction is inputted while a rendering processing module (RIP), which is for rendering based on data that was processed by an image processing module for which forcible stoppage cannot be performed, is currently executing processing.

Furthermore, it is possible to quickly and safely stop a job in order to perform cancellation processing in accordance with a job cancellation request when the number of rendering commands in the intermediate data is less than or equal to the threshold.

Also, when the number of rendering commands in the intermediate data is less than or equal to the threshold, since the processing to deploy the intermediate data for which the job cancellation was instructed has completed, even if deployment into bitmap image data is requested once again for the intermediate data, it is not necessary to re-generate the bitmap image data.

Also, in the above-described embodiments, an RIP, prior to stopping rendering processing in accordance with a cancel request, receives data from the image decompression unit 122 and discards it, but the present invention is not limited to this. For example, configuration may be taken to arrange a dedicated signal line for resetting the image decompression unit 122 from the RIP 120, and to reset the image decompression unit 122 by the signal line instead of receiving and discarding the decompression result in step S410 of FIG. 4, for example. Thereby, unprocessed data will cease to be left in the image decompression unit 122 even if the RIP 120 immediately stops processing.

In the above-described embodiments, the CPU, after receiving a job cancellation instruction from the user, instructs the RIP to stop, but the reason for the cancel request to the RIP is not limited to this. For example, naturally implementation is also possible with cancellation according to an interruption by a higher priority job such as a copy job.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-085611, filed Apr. 24, 2017, which is hereby incorporated by reference herein in its entirety.

What is claimed is:

1. An image forming apparatus, comprising:
   a memory device that stores raster image data corresponding to a background in a compressed format;
   a generator that generates intermediate data corresponding to a foreground of the background based on obtained print data;
   a decompressor that decompresses the raster image data stored in the memory device in a compressed format; and
   a rasterizer that generates new raster image data based on raster data corresponding to the background obtained by the decompression and the generated intermediate data corresponding to the foreground,
   wherein in a case where a request is made to stop the generation of the new raster image data in a state of waiting for at least a portion of the raster image data corresponding to the background to be decompressed, the rasterizer stops generation of the new raster image data, and
   the decompressor continues decompressing the at least a portion of the raster image data corresponding to the background.

2. The image forming apparatus according to claim 1, wherein the rasterizer, in the generation of the new raster image data, obtains the raster image data corresponding to the background decompressed by the decompressor, and generates the new raster image data based on the obtained raster image data and the intermediate data corresponding to the foreground, and
   wherein in the case where the request is made to stop the generation of the new raster image data in the state of waiting for the at least a portion of the raster image data corresponding to the background to be decompressed, the rasterizer obtains the at least a portion of the raster image data corresponding to the background decompressed by the decompressor.

3. The image forming apparatus according to claim 2, wherein in the case where the request is made to stop the generation of the new raster image data in the state of waiting for the at least a portion of the raster image data corresponding to the background to be decompressed, the rasterizer stops generation of the new raster image data based on the obtained at least a portion of the raster image data and the intermediate data corresponding to the foreground.

4. The image forming apparatus according to claim 1, wherein the decompressor accepts a decompression instruction for decompression of the raster image data stored in the memory device in a compressed format, and in accordance with the decompression instruction, decompresses the raster image data stored in the memory device in the compressed format, and
wherein the at least a portion of the raster image data whose decompression by the decompressor is awaited is raster image data that has not yet been decompressed among the raster image data that is the target of the decompression by the decompression instruction.

5. The image forming apparatus according to claim 1, wherein the rasterizer, in accordance with the request to stop the generation, generates raster image data having a predetermined value instead of the yet to be generated portion of the new raster image data.

6. The image forming apparatus according to claim 1, further comprising a compressor configured to compress the raster image data generated by the rasterizer, and store in the memory device the raster image data in a compressed format,
wherein the generator, in accordance with a data size of intermediate data that is already generated, temporarily stops generation of intermediate data, and causes the rasterizer to generate raster image data based on the already generated intermediate data, and causes the compressor to store the raster image data in a compressed format as the raster image data corresponding to the background, and subsequently, restarts the generation of the intermediate data.

7. The image forming apparatus according to claim 1, wherein the rasterizer composites color data of one pixel included in the raster data corresponding to the background and color data of one pixel calculated from the intermediate data corresponding to the foreground, and generates the composited color data as color data of one pixel of the new raster image data.

8. The image forming apparatus according to claim 1, further comprising a printer configured to print an image based on the new raster image data,
wherein in a case where a request is made to stop the generation of the new raster image data in a state of waiting for at least a portion of the raster image data corresponding to the background to be decompressed, the printer does not print the new raster image data.

9. An image forming apparatus, comprising:
at least one controller having one or more processors which executes instructions stored in a memory, one or more circuitries, or, a combination of the one or more processors and the one or more circuitries, wherein the at least one controller functions as:
a generation unit configured to generate intermediate data based on print data of a print job;
an image processing unit configured to process image data; and
a rendering unit configured to, together with rendering an image based on the intermediate data, output after compositing image data rendered based on the intermediate data and image data processed by the image processing unit,
wherein in accordance with the generation unit making the cancel request for the print job during execution by the rendering unit of processing for rending after the rendering unit receives the print data of the print job, the rendering unit receives and discards image data processed by the image processing unit, and after outputting unprocessed image data as image data including predetermined pixel data, stops the rendering processing.

10. The image forming apparatus according to claim 9, wherein the image processing unit comprises a decompression unit configured to decompress compressed image data,
wherein the rendering unit, when the cancel request is received during execution of the rendering processing, receives and discards image data decompressed by the decompression unit, and outputs unprocessed image data as image data that includes predetermined pixel data.

11. The image forming apparatus according to claim 10, wherein the at least one controller further functions as:
a compression unit configured to compress image data outputted from the rendering unit; and
a storage unit configured to store image data compressed by the compression unit,
wherein the decompression unit decompresses the compressed image data stored in the storage unit in accordance with a unit at which the rendering unit renders the image data.

12. The image forming apparatus according to claim 9, wherein the rendering unit divides image data having a predetermined width and height included in the print data into a plurality of regions, and renders an image in units of the respective plurality of regions.

13. The image forming apparatus according to claim 10, wherein the decompression unit decompresses the compressed image data in accordance with a decompression instruction from the rendering unit.

14. The image forming apparatus according to claim 9, wherein there are a plurality of the rendering units,
each of the plurality of the rendering units further divides each of the divided plurality of regions, and renders in units of those divided regions, and
when the each rendering unit receives a cancel request for the print job, the each rendering unit receives and discards image data of regions that the respective rendering units are in charge of among the image data processed by the image processing unit, and after outputting the unprocessed image data as image data including the predetermined pixel data, stops the processing.

15. The image forming apparatus according to claim 9, wherein the at least one controller further functions as:
an obtaining unit configured to obtain a number of rendering commands included in the print data,
wherein the rendering unit, in a case where the number of rendering commands obtained by the obtaining unit is less than or equal to a predetermined threshold, does not receive a cancel request for the print job.

16. The image forming apparatus according to claim 9, wherein the image processing unit is not able to forcibly stop processing during execution.

17. The image forming apparatus according to claim 9, wherein the generation unit discards generated intermediate data in accordance with the cancel request.

18. A method of controlling an image forming apparatus, the method comprising:
- generating intermediate data based on print data of a print job;
- processing image data; and
- together with rendering an image based on the intermediate data, outputting after compositing image data rendered based on the intermediate data and the processed image,
- wherein in accordance with a cancel request for the print job being made during execution of processing for rendering after reception of the print data of the print job, the processed image data is received and discarded, and after unprocessed image data is outputted as image data including predetermined pixel data, the rendering processing is stopped.

* * * * *